(12) United States Patent
Mahdavi

(10) Patent No.: US 7,349,337 B1
(45) Date of Patent: Mar. 25, 2008

(54) TECHNIQUES FOR SHAPING DATA TRANSMISSION RATES

(75) Inventor: Jamshid Mahdavi, San Jose, CA (US)

(73) Assignee: Novell, Inc., Provo, UT (US)

( * ) Notice: Subject to any disclaimer, the term of this patent is extended or adjusted under 35 U.S.C. 154(b) by 838 days.

(21) Appl. No.: 10/734,703

(22) Filed: Dec. 12, 2003

(51) Int. Cl.
*H04L 12/26* (2006.01)
*H04L 12/56* (2006.01)
*G06F 15/16* (2006.01)

(52) U.S. Cl. .................. 370/230.1; 370/389; 370/469; 709/232

(58) Field of Classification Search ................. 370/229, 370/230.1, 389, 469; 709/232
See application file for complete search history.

(56) References Cited

U.S. PATENT DOCUMENTS

| | | | |
|---|---|---|---|
| 5,574,934 A * | 11/1996 | Mirashrafi et al. ........... 709/207 |
| 5,649,110 A | 7/1997 | Ben-Num et al. .......... 370/351 |
| 5,864,540 A | 1/1999 | Bonomi et al. ............. 370/235 |
| 5,870,384 A | 2/1999 | Salovuori et al. ........... 370/235 |
| 5,926,459 A | 7/1999 | Lyles et al. ................. 370/230 |
| 6,064,650 A | 5/2000 | Kappler et al. ............. 370/232 |
| 6,064,651 A | 5/2000 | Rogers et al. .............. 370/233 |
| 6,215,769 B1 * | 4/2001 | Ghani et al. ................ 370/230 |
| 6,424,626 B1 * | 7/2002 | Kidambi et al. ............ 370/236 |
| 6,535,482 B1 * | 3/2003 | Hadi Salim et al. ........ 370/229 |
| 6,697,378 B1 * | 2/2004 | Patel ......................... 370/468 |
| 6,961,309 B2 * | 11/2005 | Carlson et al. ............. 370/235 |
| 6,961,539 B2 * | 11/2005 | Schweinhart et al. ...... 455/12.1 |
| 7,047,312 B1 * | 5/2006 | Aweya et al. ............... 709/235 |
| 7,225,266 B2 * | 5/2007 | Ameigeiras et al. ........ 709/235 |
| 7,242,668 B2 * | 7/2007 | Kan et al. ................... 370/234 |
| 7,283,469 B2 * | 10/2007 | Swami ....................... 370/229 |
| 7,284,047 B2 * | 10/2007 | Barham et al. ............. 709/224 |
| 2001/0017844 A1 * | 8/2001 | Mangin | |
| 2002/0080721 A1 * | 6/2002 | Tobagi | |
| 2003/0112817 A1 | 6/2003 | Woo et al. | |
| 2005/0169173 A1 | 8/2005 | Mahdavi | |
| 2006/0165029 A1 * | 7/2006 | Melpignano et al. ....... 370/328 |

FOREIGN PATENT DOCUMENTS

EP 1303087 A2 4/2003

OTHER PUBLICATIONS

"European Search Report,", *Search Report received for EP Application No. 04106294*, (Mar. 2, 2005), 4 pgs.
Zhang, H. , et al., "Rate-controlled static-priority queueing", *Networking: Foundation for the Future*, San Francisco, Mar. 28-Apr. 1, 1993, *Proceedings of the Annual Joint Conference of the Computer Communications Societies (INFOCOM)*, Los Almitos, IEEE Comp. Soc. Press, US, vol. 2, Conf. 12, (Mar. 28, 1993),227-236.

* cited by examiner

*Primary Examiner*—Alpus H. Hsu
(74) *Attorney, Agent, or Firm*—Schwegman, Lundberg & Woessner, P.A.

(57) ABSTRACT

Techniques are provided for altering a sender's network transmission rates. A sender transmits a network packet to a receiver. The receiver selectively delays sending an acknowledgment to the sender for the received network packet. The selective delay is based on the priority of the sender vis-à-vis other senders or based on a desired transmission rate for the sender. The sender transmits another network packet after receiving the acknowledgment.

13 Claims, 3 Drawing Sheets

TECHNIQUES FOR SHAPING DATA TRANSMISSION RATES

FIELD OF THE INVENTION

The invention relates generally to network processing, and more specifically to techniques for modifying a sender's network transmission rate.

BACKGROUND OF THE INVENTION

Quality of Service (QoS) refers to a networking concept of managing limited bandwidth for a multiple customers which compete for that bandwidth. QoS attempts to measure transmission rates, error rates, and other transmission characteristics with the intent of guaranteeing or improving high priority network transmissions. Generally, multimedia transmissions will implement some form of QoS for consumers that are the recipients of that multimedia. One QoS technique is achieved by assigning priorities to each sender and allocating a percentage of bandwidth to each sender based on a particular sender's priority. However, priorities and conditions are dynamically changing within a network; correspondingly, priorities must be continually monitored and modified. Dynamic priority modifications can degrade network performance and effect network throughput.

QoS may be implemented at different architectural locations within network technologies, such as within routers, and the like. Other technologies provide QoS support within network firewalls, network servers, and other network hosts.

Conventionally, bandwidth is controlled through features included within network protocols. For example, with Transmission Control Protocol (TCP)/Internet Protocol (IP), communications are divided up into different levels of communication abstraction within a network stack. At the lowest level of abstraction, IP communications occur by routing network packets between nodes and by planning delivery routes across a network. The next level of the stack abstraction is a TCP layer, here information is broken into packets and sent to the IP layer or information is re-assembled from packets that are received from the IP layer. The TCP layer passes packets to or receives packets from the IP layer of the network stack. On top of TCP layer are communications generally used by higher-level applications, such as Hypertext Transmission Protocol (HTTP) used within browser applications.

One technique that TCP protocol uses for controlling the bandwidth of a particular sender is referred to as a "sliding window." With a sliding window protocol, the sender is instructed to transmit no more than a defined number of bytes (the window). A receiver, in response to receiving the bytes responds with an acknowledgment (ACK) and indicates within the header of the ACK what additional number of bytes (sliding window) is acceptable for the sender to transmit to the receiver. Thus, the acknowledgments sent by the receiver define the sliding window or the number of additional bytes that the receiver can process. This sliding window is referred to as the "receiver window." The TCP protocol also makes use of a second sliding window referred to as a "congestion window." Unlike the receiver window, which is advertised to the TCP sender by the TCP receiver in ACK packets, the congestion window is maintained locally by the TCP sender based on its estimation of congestion in the network.

Some network devices, such as network firewalls, take advantage of the TCP receiver window to implement QoS. This technique can also be used directly by TCP receivers. This is the most prevalent technique for controlling transmission rates of senders with TCP/IP Internet communications. But, this technique requires dynamic monitoring and modification to the receiver window, which requires an active process to regularly monitor and modify TCP packets.

Thus, improved techniques for shaping data transmission rates are needed, where modifications to the receiver can be used to control transmission rates of the sender without modifying the sender.

SUMMARY OF THE INVENTION

In various embodiments of the invention, techniques are presented for rate-shaping network transmissions from senders. A sender transmits a network packet to a receiver. The receiver determines a desired transmission rate for the sender and selectively delays the sending of an acknowledgment back to the sender until the desired transmission rate is achieved. The sender sends a next network packet after receiving the acknowledgment from the receiver. Thus, the receiver controls the transmission rate of the sender.

More specifically, and in one embodiment of the invention, a method for shaping a sender's transmission rate is described. A network packet is received from a sender over a network. A desired transmission rate is identified for the sender. Furthermore, the sending of an acknowledgment is delayed for an elapsed period in order to achieve the desired transmission rate. The sender transmits a subsequent network packet upon receipt of the acknowledgment.

In another embodiment of the invention, a method for rate shaping network transmissions is presented. Network transmissions are detected that are occurring with a first application and a second application. A determination is made that the first application is a higher priority than the second application. Next, a rate at which acknowledgments are sent to the second application is decreased in order to slow a second application's transmission rate of network packets.

In still another embodiment of the invention, a transmission rate-shaping system is provided. The rate-shaping system includes a network packet queue and a rate-shaping application. The network packet queue is used for housing network packets received from a sender. The rate-shaping application selectively delays sending acknowledgments to the sender for each of the network packets received in the network packet queue. Moreover, a sender's receipt of each of the acknowledgments causes the sender to transmit another one of the packets to the network packet queue.

In yet another embodiment of the invention, a rate-shaping data structure residing in computer-readable medium, is described. The rate-shaping data structure includes an identifier for a sender, a communication port identifier for receiving network packets from the sender, and a separate storage location for each received network packet. When the rate-shaping data structure releases one of the received network packets from its storage location, an acknowledgment application sends an acknowledgment to the sender and upon receipt of the acknowledgment the sender sends another one of the network packets which is stored in an appropriate storage location of the rate-shaping data structure.

DETAILED DESCRIPTION OF THE INVENTION

Figure 1:
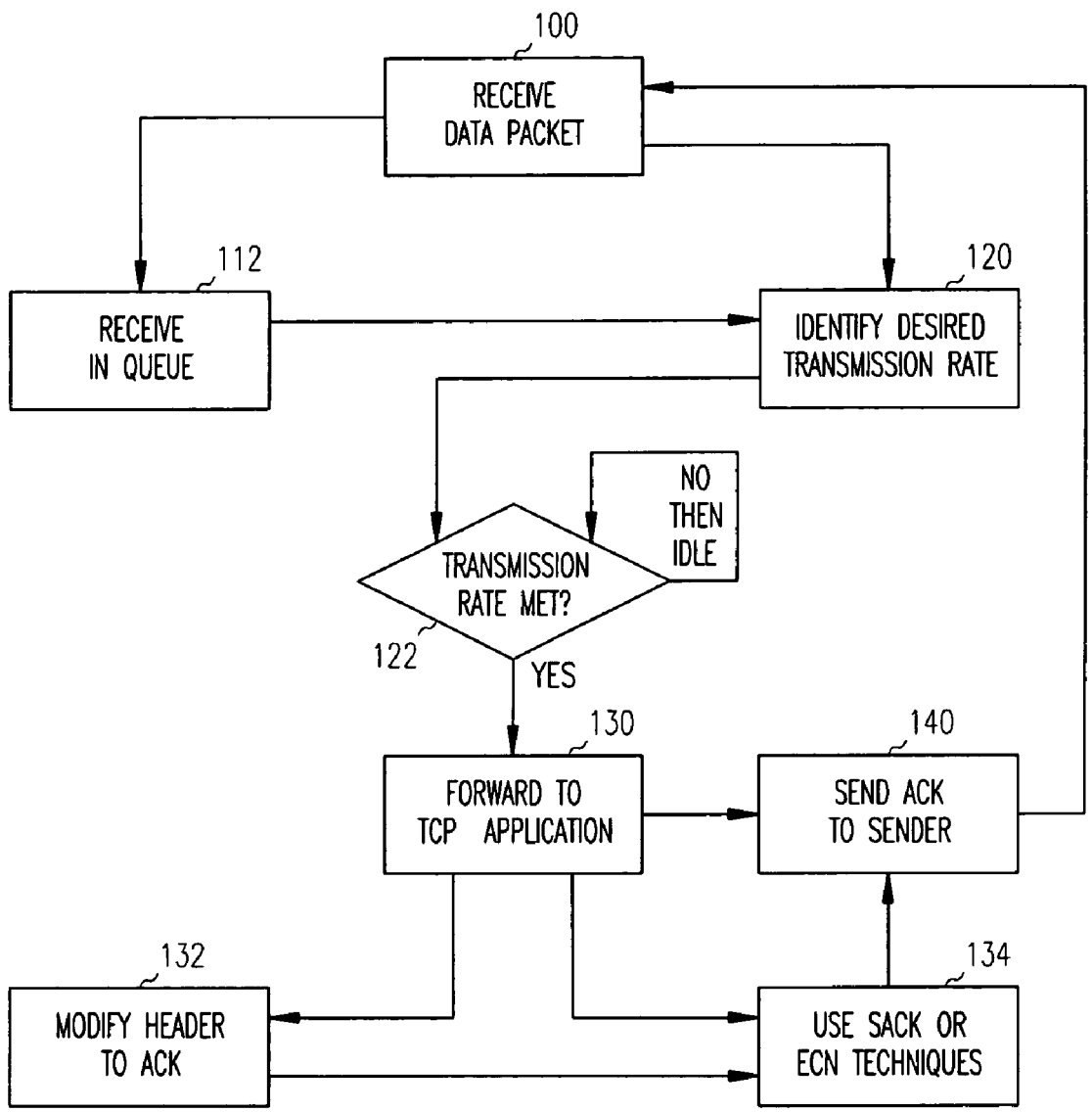
FIG. 1 is a flowchart representing a method for shaping a sender's transmission rate.

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the invention. The following description is, therefore, not to be taken in a limited sense, and the scope of the invention is defined exclusively by the appended claims.

In various embodiments of the invention, the term "sender" is used. A sender can include one or more applications acting in cooperation with one another as a system or a sender can be a computing device. In a fact, a sender can be any computing resource capable of transmitting data over a network. When a sender receives data it can become a receiver, and when a receiver transmits data it can become a sender. Thus, depending upon the operations being performed the designation of a sender or receiver can change. In one embodiment, the sender uses, either directly or indirectly, TCP/IP communications for transmitting data to a receiver. Network communications between the sender and receiver can be hardwired, wireless, or a combination of hardwired and wireless.

The phrase "rate shaping" refers to the ability to control the transmission rate of a sender during a network transaction. A network transaction is a series of communications between a sender and receiver during which the sender transmits data. Each communication can transmit a portion of that data as a packet or each communication can be an ACK being sent from the receiver to the sender, when the sender receives an ACK it is an indication to the sender that another packet of the data can be transmitted to the receiver. A communication that sends a portion of the data to the receiver need not be in the form of a single packet, since in some embodiments defined blocks of multiple packets can be sent with any single communication.

In one embodiment, the sender and receiver each include network communication stacks that utilize TCP/IP. The lowest level of the stack is the IP layer that receives packets or block of packets (when acting as a receiver) from a sender or transmits a packet or block of packets to a receiver (when acting as a sender). The IP layer also communicates with the TCP layer, the TCP layer breaks data into packets and sends the packets to the IP layer when operating as a sender and the TCP layer acquires packets from the IP layer and assembles the packets back into the original data when acting as a receiver. The TCP layer also sends ACKs to the sender for each received packet when acting as a receiver. Furthermore, the TCP layer communicates with an application layer (e.g., HTTP and other protocols) for processing send/receive commands from higher-level applications (e.g., Internet Browsers).

In one embodiment of this invention, the techniques presented herein for shaping data transmission rates are implemented in the Nterprise® Branch Office product, distributed by Novell, Inc., of Provo, Utah. However, the teachings of the invention can be integrated and implemented in existing network protocols, custom-developed network protocols, or other network appliances or applications that are designed to shape data transmission rates in the manners defined herein and below. All such implementations are intended to fall within the scope of the invention.

FIG. 1 is a flowchart representing one method 100 for shaping a sender's transmission rate during a network transaction. The method 100 is implemented as one or more applications in a computer-accessible medium. In one embodiment, the method 100 is implemented within the IP layer or between the IP and TCP layers of a network communication protocol stack application. The method 100 need not be in operation, but when the method 100 is operational it performs the following techniques for shaping or controlling the data transmission rates of a sender during a network communication. The method 100 is implemented within the communication logic of a receiver who participates in a network transaction with a sender.

Initially, a sender establishes communications with a receiver over a network. In some instances, the receiver may establish communication and request data from the sender. The sender desires to transmit data to the receiver over the network. In most cases, this data will be voluminous and span more than one packet. The sender (e.g., an Internet web server transmitting to an Internet browser application) accesses a higher-level communication protocol (e.g., HTTP or other protocols) to initially begin transmitting the data. The higher-level communication protocol interfaces with a TCP communication layer, where the data is broken up into packets and sent to an IP communication layer for routing to the receiver over the network.

At 110, the receiver's IP communication layer receives a first and initial packet of that data from the sender. In some embodiments, at 112 the received packet is placed in an IP packet queue for processing. In a conventional scenario, at this point in time the received packet would be released to the receiver's TCP communication layer, where the TCP ACK clock application would immediately send an ACK back to the sender. The ACK informs the sender to send the next packet to the receiver. However, with embodiments of this invention, ACK timing does not occur in the conventional manner.

Accordingly, at 120, the received packet is identified within the IP communication layer of the receiver and associated with a specific sender, a specific content type, or a specific communication port through which the packet was received. This information permits the receiver to assign a priority to the received packet and associated it with a desired transmission rate that the receiver desires the sender to use for the subsequent packet transmissions associated with the data being sent by the sender.

For example, suppose that the receiver wishes to limit the bandwidth transmission rate of the sender to 100 kb/s even when there is much more bandwidth than that presently available on the receiver. In this example, the processing of the method 100 identifies the sender (e.g., at 120) associated with the received packet and determines that based on the identity of the sender a desired transmission rate of 100 kb/s is needed. There may be any number of reasons why a receiver may wish to limit the bandwidth of a sender. For example, subscription rates may be based on transmission rates, non-paying customers may be configured to always receive a defined level of service, a higher-priority customer may have reserved a certain amount of bandwidth, and the like.

Once the desired transmission rate is identifier for the sender, the processing of the method 100 determines at 122 if the desired transmission rate is being achieved. This can be done by monitoring the rate at which a subsequent packet is received from the sender and if that transmission rate exceeds the desired transmission rate, then the IP layer idles and withholds the received packet from the TCP layer on the receiver until the desired rate is achieved. When the desired rate is achieved, the processing of the method 100 releases the received packet to the TCP application layer on the receiver at 130. The TCP application layer then sends an ACK to the sender at 140. The sender does not generally send another packet or block of packets until the receiver's TCP application layer acknowledges receipt of a previously sent packet.

Thus, by altering the TCP ACK clocking rate on the receiver for packets received from the sender to a desired transmission rate within the IP application layer, the TCP application layer remains unchanged on the receiver, and the receiver effectively controls or shapes the data transmission rates of the sender. Conventionally, a more complex solution is required on both TCP application layers of the receiver and the sender and transmission rates are continually monitored and altered. Here, the IP application layer of the receiver effectively and seamlessly alters the ACK clocking of the TCP application layer, which in turn achieves the desired transmission rate from the sender.

In some embodiments, the sender may have implemented an Additive Increase/Multiplicative Decrease (AIMD) congestion control technique. With AIMD techniques the sender attempts to increase a congestion window every time a packet is successfully acknowledged by the receiver. This generally does not have an overall effect on the net bandwidth used (although there may be a small effect), but it will cause the number of packets in the receiver queue to grow as the congestion window grows. Normally, TCP relies on the network to drop packets as a congestion signal, which results in a Multiplicative Decrease technique in the sender, where the sender reduces its congestion window in order to slow down transmission when it detects packets are being dropped.

With embodiments of this invention where a sender is using an AIMD technique, the IP application layer can prevent its queue from filling up by intentionally dropping a packet as soon as it is detected that the queue is being filled beyond a defined threshold or at an undesirable transmission rate. This will have the desired affect of slowing down the sender and reducing the size of the receiver's queue. However, this also means that the sender has to retransmit at least one packet that was dropped. This is undesirable because it results in some wasted bandwidth.

However, in some embodiments of the invention, bandwidth waste can be mitigated when the sender is using an AIMD technique. This can be achieved when both the sender and receiver are using TCP Selective Acknowledgments (SACK). With SACK, the receiver need not drop an entire packet; rather, a single byte of one packet can be dropped and communicated back to the sender in a TCP header for the ACK, as depicted at 132 and 134. The sender still implements a Multiplicative Decrease technique upon detecting that a byte was dropped, but the sender uses the header to only resend the missing byte. This effectively minimizes wasted bandwidth.

In another embodiment, no bandwidth loss need occur at all when the sender is using an AIMD technique. This can be achieved when both the sender and receiver are using Explicit Congestion Notification (ECN) with TCP communications. With ECN, a few bits are reserved within a TCP header and are set when the receiver's packet queue is becoming too large or larger than what is desired. When the sender receives the ACK header and sees that the bit(s) is set, the sender cuts the congestion window in half. In these embodiments, the receiver does not intentionally drop any data and still forces the sender to process a Multiplicative Decrease technique to stop overloading the receiver's packet queue. Thus, the sender reduces its transmission rate without dropping any bandwidth.

As depicted at 132 and 134 a combination of techniques can be used when a sender is implementing an AIMD technique in order to communicate to the sender that it needs to cut the congestion window.

Embodiments of FIG. 1 permit a receiver to modify an IP application layer of its network communication stack in order to control the TCP ACK clocking of the receiver's TCP application layer. This has a beneficial effect of shaping or controlling the transmission rate of the sender without modifying the sender's communication techniques. Moreover, if the sender is implementing an AIMD technique adjustments can be made to minimize or avoid wasting bandwidth.

Figure 2:
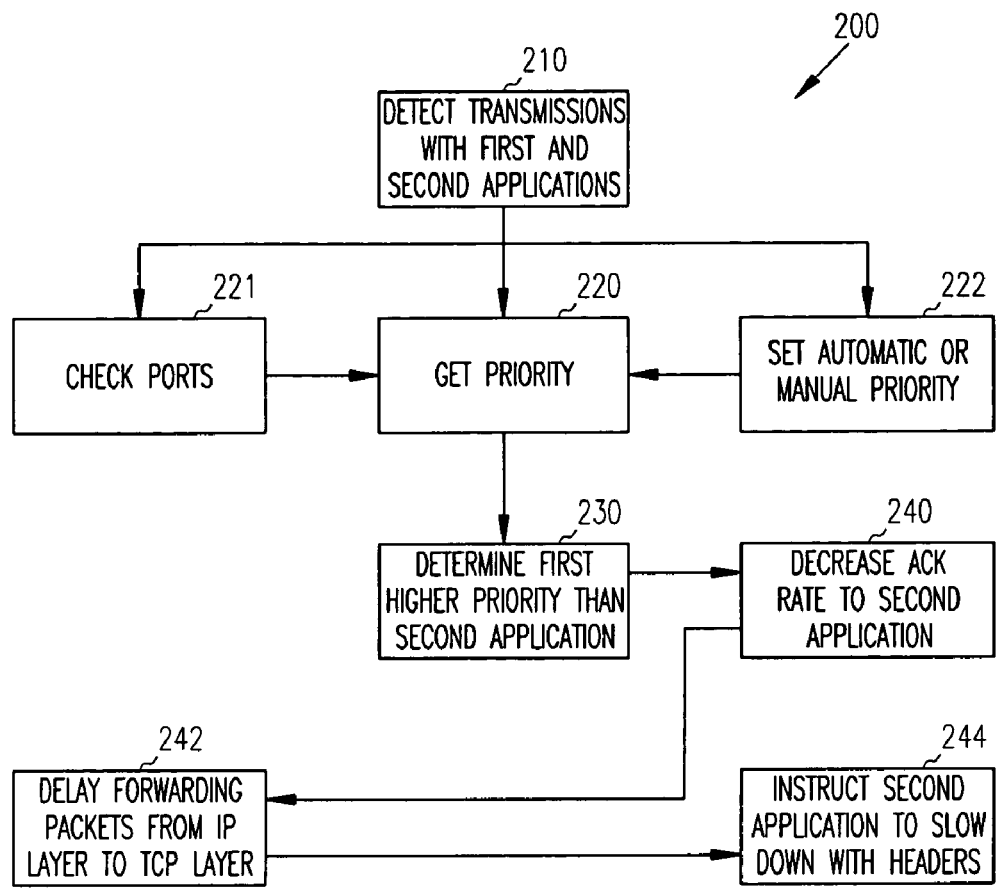
FIG. 2 is a flowchart representing method for rate shaping network transmissions.

FIG. 2 is a flowchart of one method 200 for rate shaping network transmissions. The method 200 is implemented in a computer-readable medium. In one embodiment, the method 200 is implemented within the IP application layer of a receiver's communication stack or between the IP application layer and a TCP application layer of a receiver's communication stack.

Initially, a first application establishes a network connection to a receiver. Again, in some instances, the receiver may establish the connection and request the data (this will typically be the case for World-Wide Web (WWW) applications). In one embodiment, the connection is over the Internet where the first application and receiver are communicating via an application layer using HTTP and on lower abstraction levels with TCP/IP, and the first application uses an Internet browser for communicating with the HTTP application layer and accessing the receiver. Thus, the first application accesses HTTP to send data (e.g., file) to the receiver. The first application's HTTP application layer communicates with the first application's TCP application layer. The TCP application layer breaks the file into packets and forwards the packets to the first application's IP application layer. The IP layer determines a route over the network from the first application to the receiver and begins to transmit the packets to the receiver. Individual packets may not necessarily route over the network via the same route, although they can. Initially, the IP layer transmits a single packet or a single defined block of packets to the receiver and the TCP layer awaits an ACK before transmitting the next packet or block of packets.

Concurrently, a second application performs a similar process as defined above for purposes of transmitting data to the receiver. The second application may start transmitting after the first, or before the first, but at some point in time both the first and second applications are simultaneously transmitting data to the receiver over a network.

Accordingly, at 210, the processing of the method 200 detects the data transmissions occurring with both the first and second applications. The packets of data being received from both the applications are queued within an IP application layer of the receiver. When any particular received packet is released from the queue it is received by a TCP application layer. Upon receipt of a released packet, the TCP application layer sends an ACK to the appropriate application (first or second application depending upon whose packet was released). When the applications receive an ACK, a next packet is transmitted which is again housed in a queue at the IP application layer.

At 221, before any received packets are released from the IP application layer a priority is obtained for each of the applications. In one embodiment, the priorities can be acquired simply by determining the port over which the packets are being received. For example, if the first application is an email application then it may be consistently received over a port identified as port number 25. Thus, in some embodiments, the port identification can serve as a technique for setting priorities for the first and second applications. In still other embodiments, at 222, the priorities of the applications can be identified through other metadata or through other configuration files and obtained automatically or obtained by manual interaction with the processing of the method 200.

At 230, a determination is made that the first application has a higher priority than the second application and is therefore to receive more bandwidth. Once this is determined, the packets associated with the first application are immediately released to the TCP application layer. The TCP application layer immediately sends ACKs back to the first application, and the first application immediately begins transmitting more packets.

With respect to the lower priority second application, a desired transmission rate is determined and enforced at 240 by selectively releasing packets associated from with the second application at the desired rate to the TCP application layer at 242. This alters the TCP ACK clocking for the second application and has the effect of slowing the transmission and bandwidth associated with the second application. Thus, if the second application is attempting to transmit packets at a rate in excess of the desired rate, the processing of the method 100 decreases the ACK clocking rate that is received by the second application, which forces the second application to adhere to the desired transmission rate.

Similar to the discussion of FIG. 1 above, the second application may be implementing an AIMD technique in an attempt to fill the packet queue and fill the congestion window. If this is the case, a number of techniques can be used to slow the second application. For example, packets can be intentionally dropped. Alternatively, a SACK or ECN technique can be used if both the second application and the processing of the method 200 support such techniques. Accordingly, if SACK or ECN is enabled then the second application can be instructed to slow down its transmission rate through the use of information included in the ACK headers.

The embodiments of the method 200 demonstrate how two competing applications for limited bandwidth can be dynamically prioritized such that one application receives increased bandwidth and another application can be forced to decrease its bandwidth. This is achieved by altering the ACK clocking on the receiver for the lower priority application and not by modifying the lower priority application's communication logic. It should also be noted that the configuration parameters at 22 can be dynamically changed in some embodiments, while the first application and the second application are running. This could result in dynamically changing priorities in real time.

Figure 3:
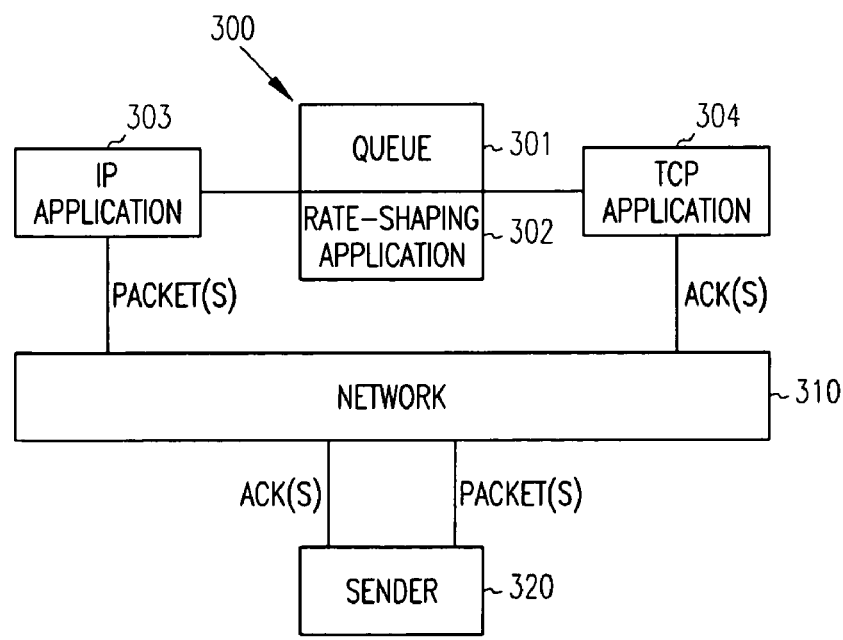
FIG. 3 is a diagram of a transmission rate-shaping system.

FIG. 3 is a diagram of one transmission rate-shaping system 300. The system 300 is implemented within the communication logic of a receiver to a network transaction. Moreover, the system 300 is implemented in computer-readable medium.

The transmission rate-shaping system 300 includes a packet queue 301 and a rate-shaping application 302. The transmission rate-shaping system 300 is interposed between an IP application layer 303 and a TCP application layer 304. The IP application layer 303 receives data packets over a network 310 from a sender 320. The TCP application layer transmits over the network 310 ACKs to the sender 320.

During operation, the system 300 receives packets from a sender 320 over the network 310. The packets are received by the IP application layer 303 where they are placed in the packet queue 301. The rate-shaping application 302 determines the identity and priority of the packet based on either the identity of the sender 320, the identity of the communication port over which the IP application 303 received the packet, and/or the content type (e.g., video, text, and the like) of the packet. The rate-shaping application 302 uses the priority to determine a desired transmission rate for the sender 320 for the packets being received in the queue 301.

The packets are not released by the rate-shaping application 302 to the TCP application layer 304 until the appropriate period of elapsed time has passed which corresponds to the desired transmission rate expected from the sender 320. When the elapsed period of time as passed, the rate-shaping application 302 releases the packet to the TCP application layer 304. The TCP application layer 304 immediately sends an ACK to the sender 320 over the network 310. When the sender 320 receives the ACK, the sender 320 knows that it may now send another packet over the network 310 to the IP application layer 303 which is then populated in the queue 301. The process continues until all packets have been received from the sender 320.

The transmission rate-shaping system 300 alters the TCP application layer's ACK clocking without altering the TCP application layer 304. Because the sender 320 conforms to communication standards, the sender will not send another packet until receiving an ACK from the TCP application layer 304. Thus, embodiments of the system 300 shapes of controls the transmission rates of the sender 320 from the receiver's side of a network transaction.

In some embodiments, the sender 320 may implement an AIMD technique in an attempt to get greater bandwidth than what is permissibly desired. In these situations, the rate shaping application 302 and/or the TCP application layer 304 can be modified to correct this situation. For example, the rate-shaping application 302 can intentionally drop packets. Alternatively, if the sender 320 is equipped with SACK capabilities, then an ACK header sent back to the sender 320 can identify a single byte that was dropped from a specified packet. Moreover, if the sender 320 is equipped with ECN capabilities, then a bit(s) in the ACK header can be set to tell the sender 320 to implement its Multiplicative Decrease technique in order to stop filling the queue 301. Thus, customized information in ACK headers can be used within some embodiments to force the sender 320 to adjust its transmission rates down to the desired transmission rate for the sender 320.

Figure 4:
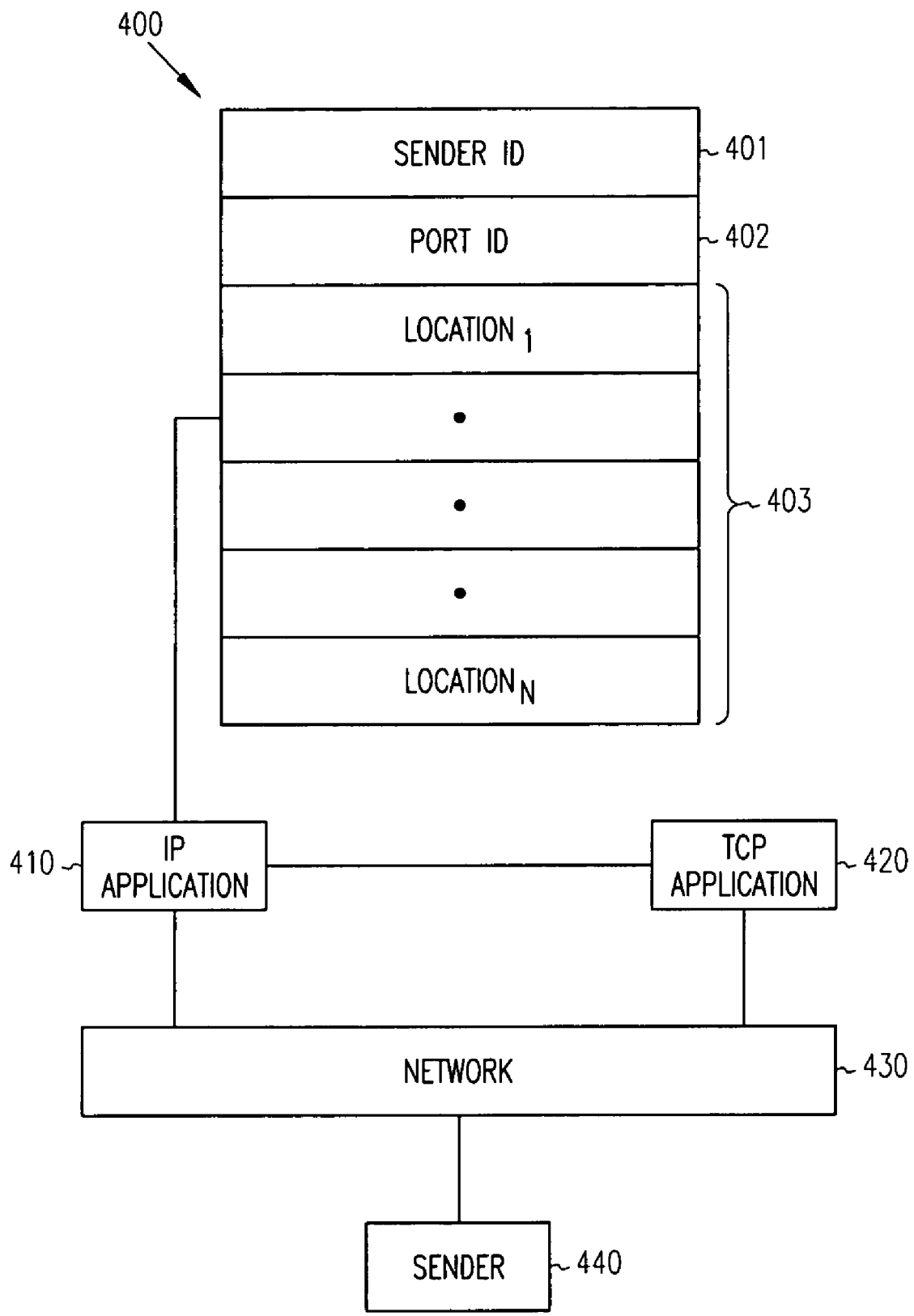
FIG. 4 is a diagram representing a rate-shaping data structure.

FIG. 4 is a diagram of one rate-shaping data structure 400. The rate-shaping data structure 400 is implemented in and accessible from a computer-readable medium. In one embodiment, the rate-shaping data structure 400 is a queue or list data structure that is populated and managed by an application accessible within an IP application layer of a communication stack for a receiver of a network transaction.

The rate-shaping data structure 400 includes a sender's identification 401, communication port identification 402 and a plurality of storage locations 403 for housing packets received from a sender or over a specific communication port. The rate-shaping data structure 400 is populated by an IP application 410. A single receiver to a network transaction can include a single instance of the rate-shaping data structure 400 or multiple instances, where each instance is associated with a specific sender or communication port. Alternatively, in some embodiments, there can be multiple instances of the rate-shaping data structure which are hierarchically arranged, such that bandwidth and transmission rates are controlled at more than one level. For example, it may be that a specific sender is always to receive a defined set of bandwidth but in a defined circumstance, defined by another parent instance of the rate-shaping data structure 400 that sender is to receive additional bandwidth. As another example, consider where a specific TCP communication port includes a predefined transmission rate limit, but all network traffic of a specific type (e.g., video) is to consume no more than a certain amount of bandwidth. This situation can be accounted for by implementing multiple levels or hierarchies of instances of the rate-shaping data structure 400 and decreasing a specific sender's transmission rate when the total video bandwidth exceeds a predefined limit.

The rate-shaping data structure 400 is populated by an IP application layer 410 that receives packets over a network 430 from a sender 440. The IP application layer 410 places the received packets in the data structure 400 based on the identifier of the sender 401 and/or the communication port identifier 402 where the packets were received. The data associated with the received packets are stored in the locations 403 within the data structure 400. The IP application layer 410 does not release the packets to the TCP application layer 430 until the appropriate amount of elapsed time has passed indicating that a desired transmission rate is being achieved.

When the appropriate amount of elapsed time has passed, the packets are released from the data structure 400 and passed to the TCP application layer 420. The TCP application layer 420 then immediately sends an ACK across the network 430 to the sender 440 whereupon the sender 440 sends another packet. Thus, the rate-shaping data structure 400 is used by the IP application layer 410 of a receiver for altering the TCP ACK clocking of the TCP application layer 420. The TCP ACK clocking determines the transmission rate of the sender 440.

As previously presented, a plurality of rate-shaping data structures 400 can be used within any network configuration. These data structures 400 can be arranged in hierarchies for achieving multiple levels of control over the TCP ACK clocking. Furthermore, the data structures 400 can include other information beyond what is presented in FIG. 4 to affect other beneficial controls or policies, such as packet content type (e.g., video, text, and the like), time of day, etc. All such additional information is intended to fall within the beneficial scope of the present invention. Moreover, if these control structures are arranged in a hierarchy, packets can be released from one control structure 400 into another instance of a control structure 400, or into the TCP application layer 420 when all levels of the hierarchy have been traversed.

The TCP application layer 420 includes an acknowledgment application; the acknowledgment application sends ACKs for released packets from the rate-shaping data structure 400. Packets are only released when the IP layer determines that an appropriate amount of elapsed time has passed such that if a packet is released, the sender 440 will be transmitting packets at a desired transmission rate for the sender 440.

In some embodiments, the acknowledgment application can be adjusted to communicate using ECN techniques or SACK techniques, when the sender 440 is implementing an AIMD technique in an effort to gain more bandwidth. Under these circumstances, the acknowledgment application uses ECN or SACK communication within the ACK headers sent to the sender 440 to force the sender 440 to slow the transmission rate and cut the congestion window.

Embodiments of the rate-shaping data structure 400 can be implemented between the IP application layer 410 and the TCP application layer 420 within a receiver's communication stack logic. By doing this, the rate-shaping data structure 400 is used for shaping or controlling the TCP ACK clocking of the TCP application layer 420 and for directly forcing the sender 440 to conform to a desired data transmission rate.

Although specific embodiments have been illustrated and described herein, one of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. § 1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A method for shaping a sender's transmission rate, comprising:
   receiving a network packet from a sender over a network;
   identifying a desired transmission rate for the sender; and
   delaying the sending of an acknowledgment to the sender for an elapsed period by idling an Internet Protocol (IP) layer processing that withholds the network packet from a Transmission Control Protocol Layer processing in order to achieve the desired transmission rate, wherein the sender transmits a subsequent network packet upon receipt of the acknowledgment.

2. The method of claim 1 wherein the receiving further includes receiving the network packet in a first queue associated with an Internet Protocol (IP) application.

3. The method of claim 2 further comprising forwarding the network packet to a Transmission Control Protocol (TCP) application after the elapsed period of time has passed, and wherein the acknowledgment is sent from the TCP application to the sender upon receipt of the network packet.

4. The method of claim 1 further comprising modifying a header of the acknowledgment that is sent to the sender which instructs the sender to slow transmission rates down for the subsequent network packet sent to the method.

5. The method of claim 4 wherein the modifying further includes identifying a single byte as missing from the network packet which instructs the sender to resend the missing byte and to slow transmission rates down for the subsequent network packet sent to the method.

6. The method of claim 5 wherein the sending further includes using a Selective Acknowledgment technique when sending the acknowledgement to the sender.

7. A method for rate shaping network transmissions, comprising:
  detecting network transmissions occurring with a first application and a second application;
  determining that the first application is a higher priority than the second application; and
  decreasing a rate at which acknowledgments are sent to the second application in order to decrease a second application's transmission rate of network packets, wherein decreasing the rate is achieved by altering a transmission control protocol acknowledgement clocking rate associated with the second application's transmission.

8. The method of claim 7 wherein the decreasing further includes delaying the forwarding of a number of the network packets associated with the second application from an Internet Protocol (IP) stack layer to a Transmission Control Protocol (TCP) stack layer in order to decrease the rate.

9. The method of claim 7 further comprising assigning priorities to the first and second applications automatically based on communication ports being used by the first and second applications.

10. The method of claim 7 further comprising manually assigning priorities to the first and second applications.

11. The method of claim 7 further comprising instructing the second application via headers associated with the acknowledgments to decrease the second application's transmission rate.

12. The method of claim 7 further comprising communicating with the first and second applications via Transmission Control Protocol/Internet Protocol (TCP/IP).

13. The method of claim 7 further comprising intentionally not sending a needed one of the acknowledgments for the second application, which causes the second application to resend a number of the network packets and to decrease the second application's transmission rate.

* * * * *